United States Patent [19]
Letort et al.

[11] 4,260,260
[45] Apr. 7, 1981

[54] PROCESS FOR CHECKING THE DIMENSION OF A PART

[75] Inventors: C. A. Letort, Boulogne; Helenio Llop; B. Grandjacques, both of Montreuil, all of France

[73] Assignee: Societe d'Optique, Precision Electronique et al Mecanique-SOPELEM, Paris, France

[21] Appl. No.: 896,673

[22] Filed: Apr. 14, 1978

[30] Foreign Application Priority Data

Apr. 25, 1977 [FR] France ............................. 77 12453

[51] Int. Cl.³ ..................... G01B 11/04; G01B 11/10
[52] U.S. Cl. ................................. 356/385; 250/224
[58] Field of Search ........................... 356/385–387; 250/224

[56] References Cited
U.S. PATENT DOCUMENTS

| 3,604,940 | 1/1971 | Matthews | 356/386 |
| 3,947,129 | 3/1976 | Wiklund | 356/385 |

FOREIGN PATENT DOCUMENTS 1395910  5/1975  United Kingdom ................. 250/224

Primary Examiner—John K. Corbin
Assistant Examiner—Wm. H. Punter
Attorney, Agent, or Firm—Haseltine and Lake

[57] ABSTRACT

In a process for checking the dimension of a part, the part is moved continuously through a parallel beam of light, in a direction perpendicular to the axis of the beam, and forms a moving shadow on a pair of spaced photoelectric cells. The cells are spaced apart a distance such that there is a zone in the movement of the part in which both cells are partially shadowed and the sum of the areas of the illuminated parts of the surfaces of the cells is measured at the moment when the difference between the areas of the illuminated parts of the surfaces of the cells is zero, and compared with a reference.

7 Claims, 5 Drawing Figures

PROCESS FOR CHECKING THE DIMENSION OF A PART

FIELD OF THE INVENTION

The invention relates to a process and device for checking dimensions.

The dimensions of parts after manufacture have hitherto been checked by sampling a few parts from a batch. In fact, it is not possible to carry out a systematic check of all the parts, because the various checking operations are frequently long and tedious when a large number of dimensions must be checked on the same part. However, it is desirable to systematically check all the parts in order to ensure their interchangeability, and to readjust the production machines as soon as it becomes necessary.

SUMMARY OF THE INVENTION

According to the invention there is provided an automatic process for checking a dimension of a part comprising projecting the profile of said part on to an optical receiver unit, said part being illuminated by a parallel beam, said optical receiver unit comprising at least one pair of photoelectric cells which are placed in a plane perpendicular to said beam and are separated from one another by a distance which is such that, when said part passes through said beam in a continuous movement perpendicular to said beam, said part passes into a zone in which said two cells are both partially obscured, moving said part continuously through said beam in a direction perpendicular thereto, measuring the sum of the areas of the illuminated surfaces of said two cells when said part passes into said zone and at the moment when the difference between the areas of the illuminated surfaces of said two cells is zero, and comparing said measurement with a reference value.

BRIEF DESCRIPTION OF THE DRAWING

The invention will be more fully understood from the following description of embodiments thereof, given by way of example only, with reference to the accompanying drawings.

In the drawings.

DETAILED DESCRIPTION

Figure 1:
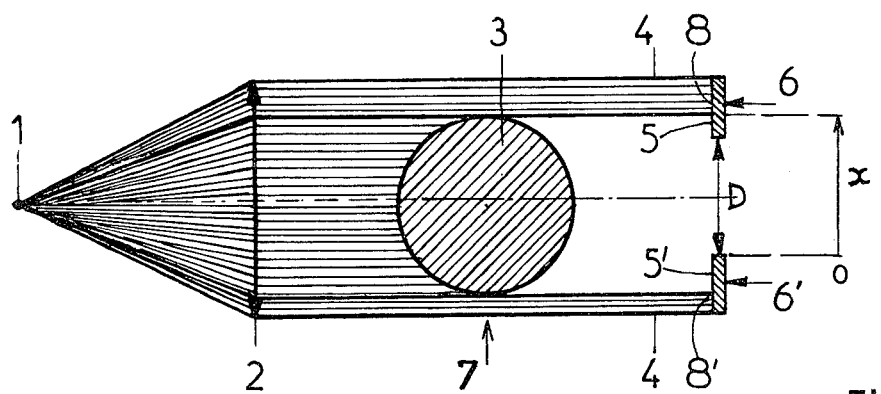
FIG. 1 shows diagrammatically a first embodiment according to the invention comprising two photoelectric cells illuminated by a parallel beam.
Figure 2:
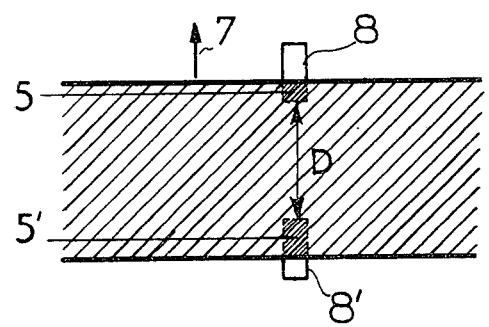
FIG. 2 is a cross-section through the diagram of FIG. 1.

Reference will first be made to FIG. 1. An intense point-source of light 1, controlled to give a constant luminosity, is placed at the focal point of an optical device 2. The part to be checked 3 is illuminated by a parallel beam 4 from device 2 and forms a shadow on two spaced photoelectric cells 6 and 6'. The part 3 passes through the beam 4 with a continuous movement perpendicular to the latter, as indicated by the arrow 7. The distance D separating the two cells is adjustable and is fixed for each series of parts, in such a way that each part which passes through the beam 4 passes into a zone in which both the cells are partially obscured. The non-illuminated parts 5 and 5' and the illuminated parts 8 and 8' of the surfaces of the cells are clearly seen in FIGS. 1 and 2.

Figure 4:
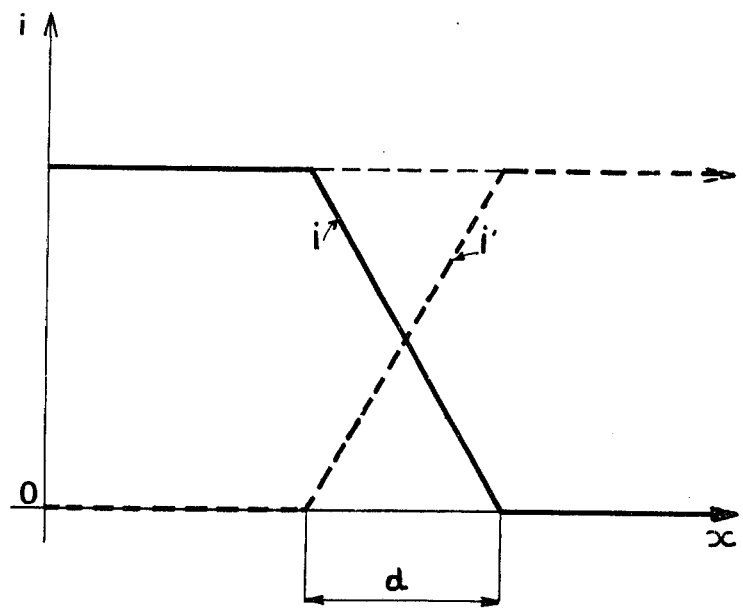
FIG. 4 shows the variations in the signals emitted by the photoelectric cells when a part passes through the parallel beam.

The photoelectric cells 6 and 6' emit electrical signals which are proportional to their illuminated surfaces 8 and 8'. FIG. 4 shows, for each cell, the variation in the electrical signal i as a function of the position x of the leading edge of part 3 during its passage through the beam 4 as measured from origin O.

The solid line curve in FIG. 4 is the curve relating to the cell 6 and the curve shown in dotted lines relates to the cell 6'. It will be noted that in zone d the sum of the signals emitted by the cells 6 and 6' is constant.

If it is desired to check the diameter of the part 3, the distance D between the cells being known, it suffices to measure the sum of the illuminated surface areas of the two cells. Since the electrical signals emitted by these cells are proportional to the illuminated surface areas 8 of the cells, it therefore suffices to measure the sum of the electrical signals i and i'. It is possible to carry out this measurement when the part is in the zone d. Furthermore, it will be seen that, at the center of the zone d, the difference between the signals i and i' emitted by the cells 6 and 6' is zero. The fact that the difference between the signals i and i' becomes zero is used to trigger the measurement of the sum of the signals i and i'.

Figure 5:
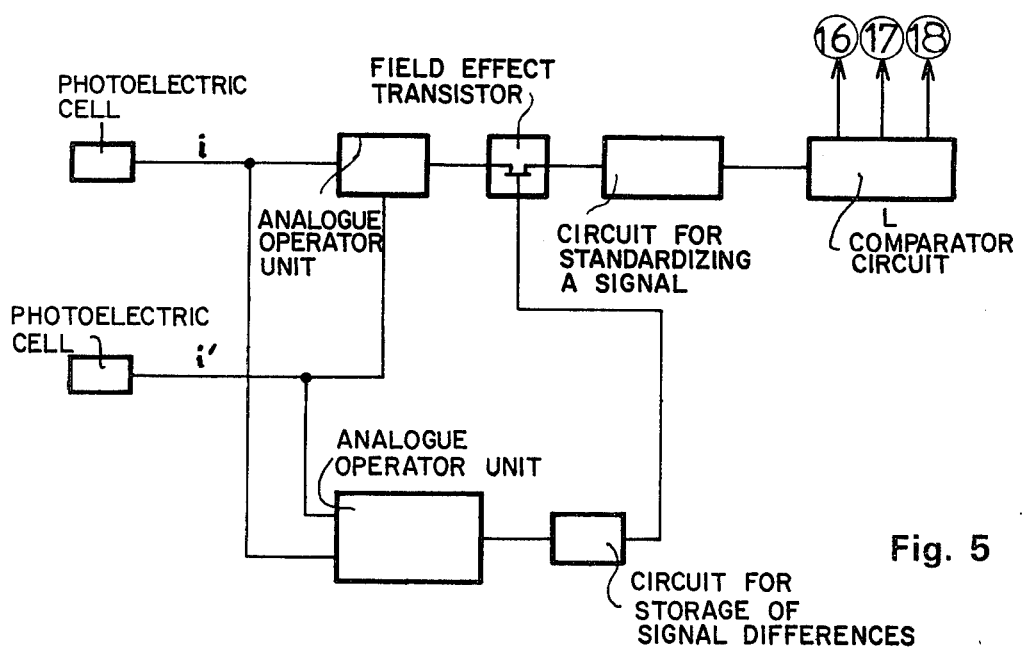
FIG. 5 is a diagrammatic illustration of a circuit associated with the pair of cells.

The signals i and i' are processed, for example, by a device such as that shown in FIG. 5. An analog operator unit 10 calculates the sum of the signals i and i' emitted by the cells 6 and 6', while an analog operator unit 11 calculates the difference i−i' which is stored for a short instant of time in a circuit 12. The signal i−i' is an enabling signal for the signal i+i'; in fact, a field-effect transistor 13 only allows the signal i+i' to pass when the signal i−i' is zero. At this moment, the signal i+i' is standardized in a circuit 14 which gives the value of that dimension of the part which it is desired to measure. This value is then compared in a circuit 15 with the corresponding tolerances and then classified into one of the three groups 16, 17 or 18, depending on whether the value is correct, too small or too large. Automatic sorting can therefore be carried out using this device.

Figure 3:
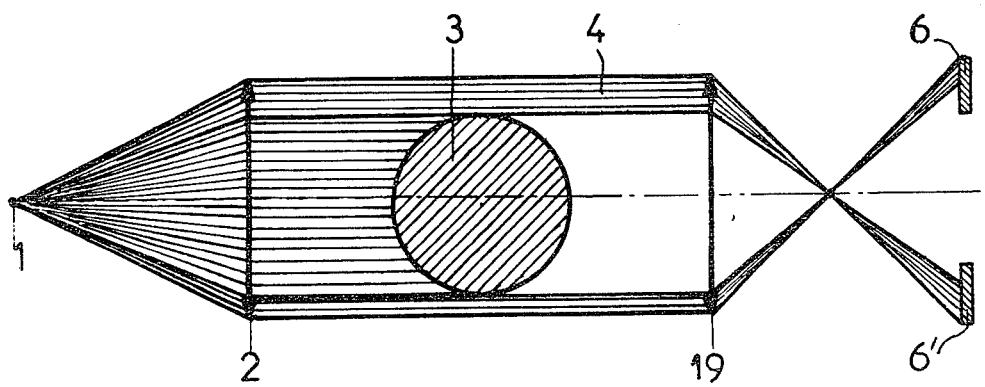
FIG. 3 shows a second embodiment according to the invention.

FIG. 3 shows a process which makes it possible to produce a better separation of stray rays from useful rays of the beam 4, in particular when parts having small dimensions are measured.

In FIG. 3, the light rays of the beam 4 which have not been stopped by the part 3 do not illuminate the cells 6 and 6' directly, but are focussed using an objective 19. A more precise diaphragming of the light is thus obtained.

The above described processes exhibit numerous advantages. Firstly, the optical principle makes it possible to carry out very precise and highly reliable measurements. Furthermore, a part can be measured in motion; it is therefore not necessary to stop the part in the way which has been necessary hitherto. However, if it is desired to measure the out-of-roundness of a part, the part can be stopped at the moment when the difference between the illuminated surfaces on the two cells is zero, and it can then be rotated around its axis while several measurements are carried out. It is also possible to measure defects of parallelism between faces. Further checks can be envisaged, such as checking the presence or absence of holes in the parts, the presence of burrs and the like, thus completing a genuinely metrological check.

The above described process and device enable a series of identical parts to be checked continuously and at high speed, the distance of separation between the cells being fixed once and for all, for the series.

Furthermore, it is possible to check parts without causing wear of the measuring components and without adversely affecting the parts being checked, because there is no contact whatsoever between the parts to be checked and the checking device. In addition, by virtue of the optical principle chosen, movement of the part being checked in the x direction, in the direction of the beam 4 or in a direction perpendicular to the first two directions, does not alter the precision of the checking, however large this movement may be. Therefore, the parts do not need to be precisely positioned in front of the checking device, which simplifies the handling members of the latter.

An additional advantage of the process and device is that they make it possible to simultaneously check a large number of diameters and lengths of the same part. The number of pairs of cells used is therefore the same as the number of dimensions to be measured. If necessary, it is possible to use several illuminating stations, each of which illuminates a certain number of pairs of cells.

Of course, the invention is intended to cover all those variants of the process and device described above which would only differ in details or in the use of equivalent means.

There is thus provided a process and device whereby it is possible to replace the checking of dimensions of parts by sampling a few parts from a batch by a systematic check of all the parts in the batch. In fact, it makes it possible to check the dimensions of a series of identical parts, rapidly, continuously, without contact and without it being necessary to precisely position the parts to be checked.

What is claimed is:

1. An automatic process for checking a dimension of a part comprising illuminating a part to be checked by a parallel beam having a width greater than the dimension of the part to be checked whereby only a portion of the beam can be obscured by the part, passing said part through said beam with a continuous movement in a direction perpendicular to said beam, projecting a profile of said part onto an optical receiver unit, said optical receiver unit comprising at least one pair of photoelectric cells which are placed in a plane perpendicular to said beam and are separated from one another by a distance which is such that, when said part passes through said beam in a continuous movement perpendicular to said beam, said part passes into a zone in which said two cells are both partially obscured, and the measurement of the sum of the areas of the illuminated surfaces of the two cells is effected when the difference between the areas is zero.

2. A process as claimed in claim 1 including stopping said part at the moment when the difference between said areas of said illuminated surfaces of said two cells is zero, and then rotating said part around an axis while making measurements to measure any out-of-roundness of said part.

3. A process as claimed in claim 1 comprising comparing the measured sum of the areas with a reference value.

4. The process of claim 1 carried out by apparatus comprising optical emitter means comprising at least one intense point-source of light which is controlled to give a constant luminosity; an optical device having a focal point; means mounting said source of light at said focal point of said optical device so that the optical device produces a parallel beam of light; an optical receiver means disposed in spaced relation with said optical device and comprising at least one pair of photoelectric cells arranged in a plane perpendicular to the beam produced by said optical device, said cells being separated from one another by a distance such that, when a part passes between said optical device and said receiver means in a continuous movement perpendicular to such beam, the part passes into a zone in which said two cells are both partially obscured, and an electronic circuit including adder means associated with said cells for calculating the sum of electrical signals emitted by said cells, gate means connected in series with said adder means, reference value means connected in series with said gate means, and control means connected to said cells and said gate means in parallel with said adder means for controlling the gate means, said control means measuring the difference of the signals emitted by said cells.

5. Apparatus as claimed in claim 4 comprising comparison means for comparing a reference value from said reference value means with said sum from said adder means.

6. Apparatus as claimed in claims 4 or 5, wherein said control means is operative to activate the gate means to pass the sum produced by the adder means to said reference value means when the difference of the signals emitted by the cells is zero.

7. Apparatus as claimed in claim 6 including an objective for focussing the light rays which illuminate said pair of cells, said objective being placed between the passage for the part and said pair of cells.

* * * * *